United States Patent [19]
Morozowich

[11] 3,894,062
[45] July 8, 1975

[54] SUBSTITUTED PHENYL AND NAPHTHYL ESTERS OF PGE$_2$

[75] Inventor: Walter Morozowich, Kalamazoo, Mich.

[73] Assignee: The Upjohn Company, Kalamazoo, Mich.

[22] Filed: Nov. 23, 1973

[21] Appl. No.: 418,387

[52] U.S. Cl. ............ 260/395; 260/390; 260/468 D; 260/471 R; 260/473 R; 260/476 R; 260/999
[51] Int. Cl.$^2$ ................ C09B 11/06; C07C 69/074
[58] Field of Search ............ 260/471 R, 390, 473 R, 260/479 R, 468 D, 395, 476 R

[56] References Cited
OTHER PUBLICATIONS

Buehler, C. A., et al., Organic Synthesis, (1970), pub. by Wiley-Interscience of N.Y. (QD262.B7) page 880 relied on.

Royals, E. E. Advanced Organic Chemistry, (1961), pub. by Prentice-Hall of N.J. (QD251R68C.6) page 605 relied on.

*Primary Examiner*—Lorraine A. Weinberger
*Assistant Examiner*—L. A. Thaxton
*Attorney, Agent, or Firm*—Morris L. Nielsen

[57] ABSTRACT

Substituted phenyl and naphthyl esters of PGE$_2$, 15-alkyl-PGE$_2$, and 15(R)-15-alkyl-PGE$_2$, and their racemic forms, and processes for producing them are disclosed. The products are useful for the same pharmacological and medical purposes as PGE$_2$, 15-alkyl-PGE$_2$, and 15(R)-15-alkyl-PGE$_2$, and are also useful as a means for obtaining highly purified PGE$_2$, 15-alkyl-PGE$_2$, and 15(R)-alkyl-PGE$_2$ products.

25 Claims, No Drawings

SUBSTITUTED PHENYL AND NAPHTHYL ESTERS OF PGE₂

BACKGROUND OF THE INVENTION

This invention relates to novel ester derivatives of prostaglandin E₂ (hereinafter identified as "PGE₂"), 15-methyl-PGE₂, 15(R)-15-alkyl-PGE₂, and their racemic forms, and to processes for producing them.

PGE₂ is represented by the formula:

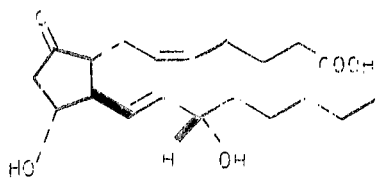

A systematic name for PGE₂ is 7-{3α-hydroxy-2β-[(3S)-3-hydroxy-trans-1-octenyl]-5-oxo-1α-cyclopentyl}-cis-5-heptenoic acid. PGE₂ is known to be useful for a variety of pharmacological and medical purposes, for example labor induction and abortion in pregnant animals, including humans, menstrual regulation in both pregnant and non-pregnant animals, including humans, reduction and control of gastric secretion, and as a hypotensive agent to reduce blood pressure in mammals, including humans. See Bergstrom, et al., Pharmacol. Rev. 20, 1 (1968) and references cited therein. As to racemic PGE₂, see for example W. P. Schneider, Chem. Commun. 304 (1969).

The 15-alkyl-PGE₂ analog and its 15(R) epimer are represented by the formula:

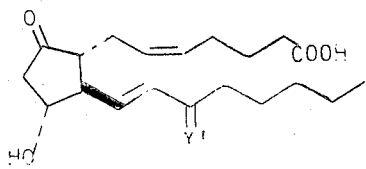

wherein Y' is

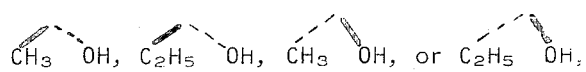

following the usual convention wherein broken line attachment of hydroxy to the side chain at carbon 15 indicates the natural or S configuration and solid line attachment of hydroxy indicates the epi or R configuration. See for example Nugteren, et al., Nature 212, 38 (1966) and Cahn, J. Chem. Ed. 41, 116 (1964). The 15-alkyl- and 15(R)-15-alkyl-PGE₂ analogs in their optically active and racemic forms are known. See for example U.S. Pat. No. 3,728,382. These analogs are also useful for the above-described pharmacological purposes.

Esters of the above compounds are known, wherein the hydrogen atom of the carboxyl group is replaced by a hydrocarbyl or substituted hydrocarbyl group. Among these are the methyl ester of PGE₂ (B. Samuelsson, J. Biol. Chem. 238, 3229 (1963)), the methyl ester of 15-methyl-PGE₂ (E. W. Yankee, et al., J. Am. Chem. Soc. 94, 3651 (1972)), the decyl ester of PGE₂ (Belgian Pat. No. 765,732, Derwent Farmdoc No. 67580S), the 2-phenoxyethyl ester of PGE₂ (Belgian Pat. No. 776,294, Derwent Farmdoc No. 39011T), the phenyl and alkyl-phenyl esters of PGE₂ (British Pat. No. 1,282,661, see Derwent Farmdoc No. 67438R) and the p-(1,1,3,3-tetramethyl-butyl)-phenyl ester of PGE₂, the α (and β-)naphthyl ester of PGE₂, and the 5,6,7,8-tetrahydro-2-naphthyl ester of PGE₂ (Belgian Pat. No. 775,106, Derwent Farmdoc No. 33705T).

SUMMARY OF THE INVENTION

It is a purpose of this invention to provide novel ester derivatives of prostaglandin PGE₂, 15-alkyl-PGE₂, 15(R)-15-alkyl-PGE₂, and their racemic forms. It is a further purpose to provide such esters derived from substituted phenols and naphthols. It is a further purpose to provide such esters in a free-flowing crystalline form. It is still a further purpose to provide novel processes for preparing these esters.

The presently described esters include compounds represented by the generic formula:

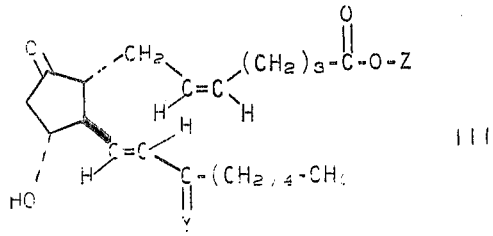

wherein Z is the substituted phenyl or naphthyl group as defined immediately below, and Y is

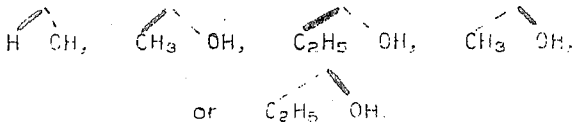

i.e., esters of PGE₂, 15-methyl-PGE₂, 15(R)-15-methyl-PGE₂, 15-ethyl-PGE₂, and 15(R)-15-ethyl-PGE₂; and also the racemic compounds represented by each respective formula and the mirror image thereof; Z being represented by

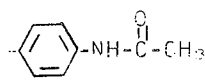

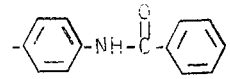

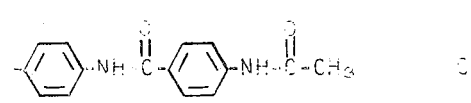

| 3 | | 4 | |
|---|---|---|---|
|  | D | 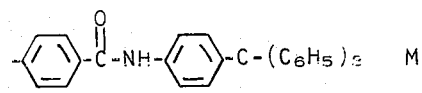 | L |
| 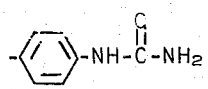 | E | 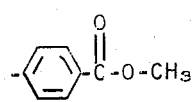 | M |
| 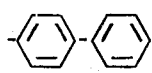 | F | 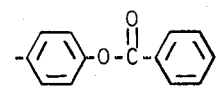 | N |
| 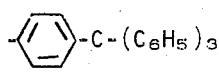 | G | 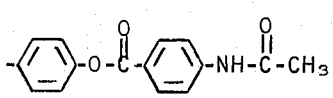 | O |
| 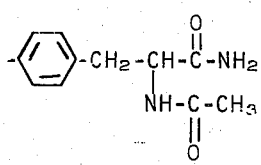 | H | 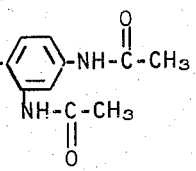 | P |
| 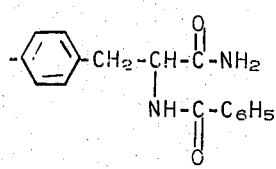 | I | 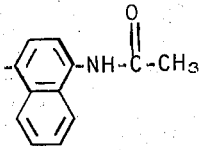 | Q |
| 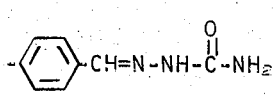 | J | 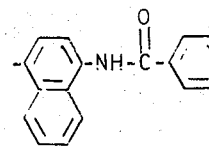 | R |
| 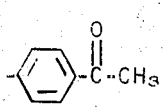 | K | 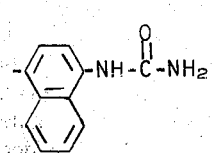 | S or |
| 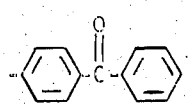 | K' | | T |

For example, PGE$_2$, p-acetamidophenyl ester, is represented by formula III when Y is

and Z is A, i.e.

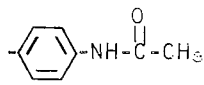

and is conveniently identified herein as the PGE$_2$ ester of formula III-A. Racemic compounds are designated by the prefix "racemic" or "dl"; when that prefix is absent, the intent is to designate an optically active compound. Racemic 15-methyl-PGE$_2$, p-benzamidophenyl ester, corresponds to formula III wherein Y is

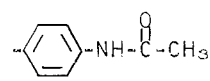

and Z is B, i.e.

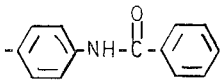

including of course not only the optically active isomer represented by formula III but also its mirror image.

The novel formula-III compounds and corresponding racemic compounds of this invention are each useful for the same purposes as described above for PGE$_2$ and are used for those purposes in the same manner known in the art, including oral, sublingual, buccal, rectal, intravaginal, intrauterine, or topical administration.

For many applications these novel prostaglandin esters which I have obtained from certain specified phenols and napthols have advantages over the corresponding known prostaglandin compounds. Thus, these substituted phenyl and naphthyl esters are surprisingly stable compounds having outstanding shelf-life and thermal stability. In contrast to the acid form of these prostaglandins, these esters are not subject to acid-catalyzed decomposition either by elimination of water or by epimerization. Thus these compounds have improved stability either in solid, liquid, or solution form. In oral administration these esters have shown surprisingly greater efficacy than the corresponding free acids or lower alkyl esters, whether because of longer duration of biological activity or because of improved lipophilicity and absorption is not certain. These esters offer a further advantage in that they have low solubility in water and the body fluids and are therefore retained longer at the site of administration.

A particularly outstanding advantage of many of these substituted phenyl and naphthyl esters is that they are obtained in free-flowing crystalline form, generally of moderately high melting point, in the range 90°–180° C. This form is especially desirable for ease of handling, administering, and purifying. These crystals are highly stable, for example showing practically no decomposition at accelerated storage tests at 65° C., in comparison with liquid alkyl esters or the free acids. This quality is advantageous because the compound does not lose its potency and does not become contaminated with decomposition products.

The crystalline esters also provide a means of purifying PGE$_2$, 15-methyl-PGE$_2$, 15(R)-15-methyl-PGE$_2$, 15-ethyl-PGE$_2$, or 15(R)-15-ethyl-PGE$_2$, which are first converted to one of these esters, recrystallized until pure, and then recovered as the free acid. One method of recovering the free acid is by enzymatic hydrolysis of the ester, for example with a lipase. See German Pat. No. 2242792, Derwent Farmdoc No. 23047U.

To obtain the optimum combination of stability, duration of biological activity, lipophilicity, solubility, and crystallinity, certain compounds within the scope of formula III are preferred.

One preference is that Z is limited to either

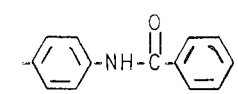

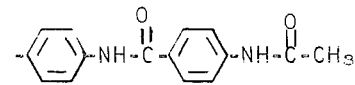

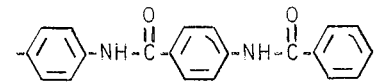

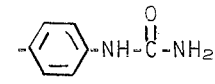

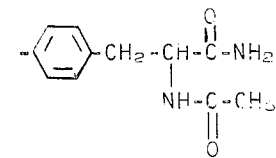

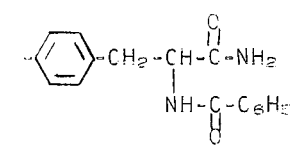

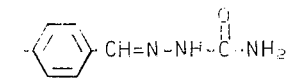

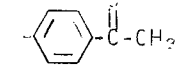

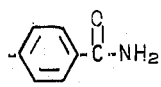
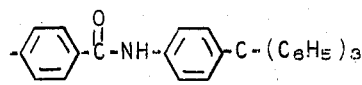
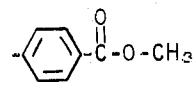
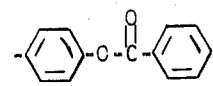
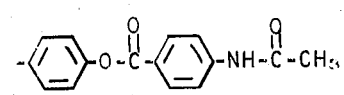
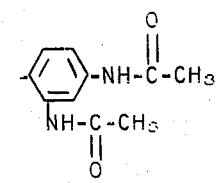
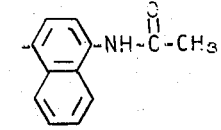
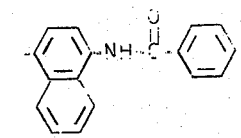
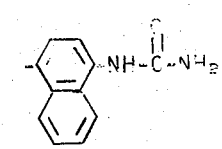
Another preference is that Z is further limited to
(1) 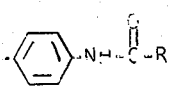
wherein R is
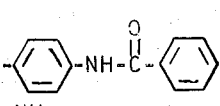
(2) 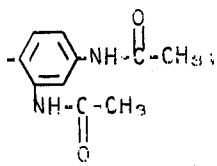 or
(3) 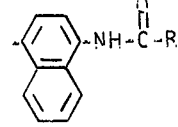
wherein R is     $-CH_3$
 or
$-NH_2$.
Another preference is that Z is limited to
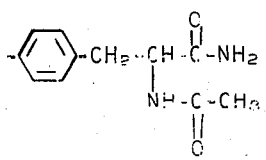
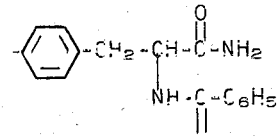 or
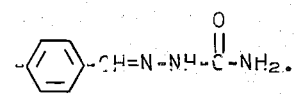
Another preference is that Z is limited to
(1) 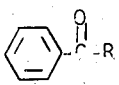
wherein R is
$-CH_3$
$-NH_2$
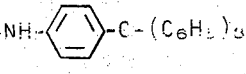 or
$-O-CH_3$;

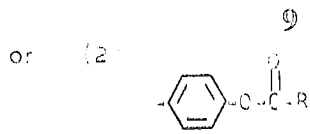

wherein R is  or

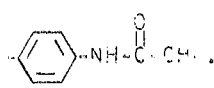

Especially preferred are those compounds which are in free-flowing crystalline form, for example:
p-acetamidophenyl ester of $PGE_2$
p-benzamidophenyl ester of $PGE_2$
p-(p-acetamidobenzamido)phenyl ester of $PGE_2$
p-hydroxyphenylurea ester of $PGE_2$
p-biphenyl ester of $PGE_2$
p-hydroxybenzaldehyde semicarbazone ester of $PGE_2$
p-acetamidophenyl ester of 15-methyl-$PGE_2$
p-benzamidophenyl ester of 15-methyl-$PGE_2$
p-benzamidophenyl ester of 15(R)-15-methyl-$PGE_2$ or
p-hydroxybenzaldehyde semicarbazone ester of 15(R)-15-methyl-$PGE_2$.

The substituted phenyl and naphthyl esters of $PGE_2$, 15-alkyl-$PGE_2$, and 15(R)-15-alkyl-$PGE_2$ encompassed by formula III wherein Z is defined by ester groups A through T are produced by the reactions and procedures described and exemplified hereinafter. For convenience, the above prostaglandin or prostaglandin analog is referred to as "the PG compound." The term "phenol" is used in a generic sense, including both phenols and napthols.

Various methods are available for preparing these esters, differing as to yield and purity of product. Thus, by one method, the PG compound is converted to a tertiary amine salt, reacted with pivaloyl halide to give the mixed acid anhydride and then reacted with the phenol. Alternately, instead of pivaloyl halide, an alkyl or phenylsulfonyl halide is used, such as p-toluenesulfonyl chloride. See for example Belgian Pat. Nos. 775,106 and 776,294, Derwent Farmdoc Nos. 33705T and 39011T.

Still another method is by the use of the coupling reagent, dicyclohexylcarbodiimide. See Fieser, et al., "Reagents for Organic Synthesis," pp. 231–236, John Wiley and Sons, Inc., New York (1967). The PG compound is contacted with one to ten molar equivalents of the phenol in the presence of 2–10 molar equivalents of dicyclohexylcarbodiimide in pyridine as a solvent.

The preferred novel process for the preparation of these esters, however, comprises the steps (1) forming a mixed anhydride with the PG compound and isobutylchloroformate in the presence of a tertiary amine and (2) reacting the anhydride with an appropriate phenol or naphthol.

The mixed anhydride is represented by the formula:

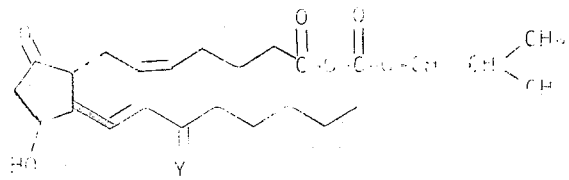

for the optically active PG compounds, Y having the same definition as above.

The anhydride is formed readily at temperature in the range −40° to +60° C., preferably at −10° to +10° C. so that the rate is reasonably fast and yet side reactions are minimized. The isobutylchloroformate reagent is preferably used in excess, for example 1.2 molar equivalents up to 4.0 per mole of the PG compound. The reaction is preferably done in a solvent and for this purpose acetone is preferred, although other relatively non-polar solvents are used such as acetonitrile, dichloromethane, and chloroform. The reaction is run in the presence of a tertiary amine, for example triethylamine, and the co-formed amine hydrochloride usually crystallizes out, but need not be removed for the next step.

The anhydride is usually not isolated but is reacted directly in solution with the phenol, preferably in the presence of a tertiary amine such as pyridine.

The phenol is preferably used in equivalent amounts or in excess to insure that all of the mixed anhydride is converted to ester. Excess phenol is separated from the product by methods described herein or known in the art, for example by crystallization. The tertiary amine is not only a basic catalyst for the esterification but also a convenient solvent. Other examples of tertiary amines useful for this purpose include N-methylmorpholine, triethylamine, diisopropylethylamine, and dimethylaniline. 2-methylpyridine and quinoline result in a slow reaction. A highly hindered amine such as 2,6-dimethyllutidine is not useful because of the slowness of the reaction.

The reaction with the anhydride proceeds smoothly at room temperature (about 20° to 30° C.) and can be followed in the conventional manner with thin layer chromatography (TLC), usually being found complete within 1–4 hours.

The reaction mixture is worked up to yield the ester following methods known in the art, and the products is purified, for example by silica gel chromatography.

Solid esters are converted to a free-flowing crystalline form on crystallization from a variety of solvents, including ethyl acetate, tetrahydrofuran, methanol, and acetone, by cooling or evaporating a saturated solution of the ester in the solvent or by adding a miscible non-solvent such as diethyl ether, hexane, or water. The crystals are then collected by conventional techniques, e.g., filtration or centrifugation, washed with a samll amount of solvent, and dried under reduced pressure. They may also be dried in a current of warm nitrogen or argon, or by warming to about 75° C. Although the crystals are normally pure enough for many applications, they may be recrystallized by the same general techniques to achieve improved purity after each recrystallization.

DESCRIPTION OF THE PREFERRED EMBODIMENTS

The invention can be more fully understood by the following examples.

All temperatures are in degrees centigrade.

Silica gel chromatography, as used herein, is understood to include chromatography on a column packed with silica gel, elution, collection of fractions, and combination of those fractions shown by thin layer chromatography (TLC) to contain the desired product free of starting material and impurities.

"TLC," herein, refers to thin layer chromatography.

PREPARATION 1 p-Benzamidophenol

A solution of p-hydroxyaniline (20 g.) in 200 ml. of pyridine is treated with benzoic anhydride (20 g.). After 4 hr. at about 25° C., the mixture is concentrated under reduced pressure and the residue is taken up in 200 ml. of hot methanol and reprecipitated with 300 ml. of water. The product is recrystallized from hot acetonitrile as white crystals, 8.5 g., m.p. 218.0°–218.5° C.

PREPARATION 2 p-(p-Acetamidobenzamido)phenol

A solution of p-acetamidobenzoic acid (12.5 g.) in 250 ml. of tetrahydrofuran is treated with triethylamine (11.1 ml.). The mixture is then treated with isobutylchloroformate (10.4 ml.) and, after 5 min. at about 25° C., with p-aminophenol (13.3 g.) in 80 ml. of dry pyridine. After 40 min. the crude product is obtained by addition of 2 liters of water. The product is recrystallized from 500 ml. of hot methanol by dilution with 300 ml. of water as white crystals, 5.9 g., m.p. 275.0°–277.0° C.

EXAMPLE 1

PGE$_2$, p-Acetamidophenyl Ester (Formula III-A).

A solution of PGE$_2$ (0.215 g.) and triethylamine (0.165 ml.) in 20 ml. of acetone is treated at −10° C. with isobutylchloroformate (0.159 ml.) whereupon triethylamine hydrochloride is precipitated. After 5 min. the mixture is treated with p-acetamidophenol (0.659 g.) in 5 ml. of pyridine for 3 hr. at about 25° C. The solvent is removed under reduced pressure and the residue taken up in acetonitrile and again concentrated. The crude residue is dissolved in ethyl acetate and washed with aqueous citric acid (2%) and water. The organic phase is dried over sodium sulfate, concentrated, and triturated in hexane to a pasty solid. The product is subjected to silica gel chromatography, eluting with ethyl acetate followed by ocetonitrile. The residue obtained by concentration of selected fractions, a solid on chilling, is the title compound, 0.192 g., having Rf 0.2 (TLC on silica gel in ethyl acetate-acetic acid, 97:3). It is recrystallized from ethyl acetate-diethyl ether as white free-flowing crystals, m.p. 112.3°–113.0° C.

EXAMPLE 2

PGE$_2$, p-Benzamidophenyl Ester (Formula III-B).

A solution of PGE$_2$ (0.26 g.) and triethylamine (0.206 ml.) in 20 ml. of acetone is treated at −5° C. with isobutyl chloroformate (0.194 ml.), whereupon triethylamine hydrochloride is precipitated. The mixture is then treated with p-benzamidophenol (Preparation 1, 0.8 g.) in 8 ml. of pyridine for 4 hr. at about 25° C. The solvent is removed under reduced pressure and the crude residue is subjected to silica gel chromatography, eluting with ethyl acetate followed by acetonitrile. The residue obtained by concentration of selected fractions is recrystallized from tetrahydrofuran-hexane (1:1) to yield the title compound, white free-flowing crystals, 0.269 g., m.p. 132.8°–135.0° C., having Rf 0.5 (TLC on silica gel in ethyl acetate); recrystallized from tetrahydrofuran-diethyl ether, m.p. 138.3°–139.5° C.

EXAMPLE 3

PGE$_2$, p-(p-Acetamidobenzamido)phenyl Ester (Formula III-C)

A solution of PGE$_2$ (0.25 g.) and triethylamine (0.186 ml.) in 15 ml. of acetone is treated at −10° C. with isobutylchloroformate (0.202 ml.) and, after 5 min. at 0° to −5° C., with a solution of p-[(p'-acetamidophenyl)-carbamoyl]-phenol (Preparation 2, 0.96 g.) in 10 ml. of pyridine for 4 hr. at about 25° C. The solvent is removed under reduced pressure and the residue is partitioned between 100 ml. of ethyl acetate and 100 ml. of 0.1 N. aqueous monosodium dihydrogen orthophosphate. The organic phase is dried over sodium sulfate and concentrated. The residue is taken up in 25 ml. of ethyl acetate, filtered, and the solution concentrated. The crude residue is dissolved in 1 ml. of dimethylformamide and 4 ml. of ethyl acetate and the solution subjected to silica gel chromatography, eluting with 3–8% methanol in ethyl acetate. The residue obtained by concentration of selected fractions is recrystallized from methanol-acetone (1:5) on addition of water, to yield the title compound, white free-flowing crystals, estimated 0.09 g., m.p. 173.2°–176.2° C., having Rf 0.5 (TLC on silica gel in ethyl acetate-methanol 92:8).

EXAMPLE 4 p-Hydroxyphenylurea Ester of PGE$_2$ (Formula III-E)

Following the procedure of Example 1 but using 0.453 g. of PGE$_2$, 0.27 ml. of triethylamine, 0.254 ml. of isobutylchloroformate, and 1.0 g. of p-hydroxyphenylurea, there is obtained a brown oily crude residue. This residue is dissolved in 100 ml. of ethyl acetate and 10 ml. of methanol, extracted with 0.1 N. aqueous hydrochloric acid and water, and the organic phase dried over sodium sulfate. The residue left on concentrating is subjected to silica gel chromatography, eluting with ethyl acetate-acetone (7:3) and ethyl acetate-acetone (2:3). The residue, obtained by concentration of selected fractions, 0.56 g., is recrystallized from 10 ml. of ethyl acetate on addition of one ml. of hexane as the title compound, white free-flowing crystals, 0.396 g., m.p. 105.3°–108.3° C., having Rf 0.5 (TLC on silica gel in ethyl acetate-acetone, 1:1).

EXAMPLE 5

PGE$_2$, p-Biphenyl Ester (Formula III-F)

Following the procedure of Example 1 but using 0.51 g. of PGE$_2$, 0.24 ml. of triethylamine, 0.226 ml. of isobutylchloroformate, and 0.49 g. of p-phenylphenol, there is obtained a crude oily residue which is taken up in ethyl acetate and concentrated several times. The brown oil is then subjected to silica gel chromatography, eluting with ethyl acetate containing 2% water. The residue obtained by concentration of selected fractions, 0.735 g., is recrystallized from 6 ml. of ethyl acetate on addition of 12 ml. of hexane as the title compound, white free-flowing crystals, 0.585 g., mp. 91.8°–92.8° C., having Rf 0.6 (TLC on silica gel in ethyl acetate).

EXAMPLE 6

$PGE_2$, p-Tritylphenyl Ester (Formula III-G)

Following the procedure of Example 1 but using 0.531 g. of $PGE_2$, 0.254 ml. of triethylamine, 0.238 ml. of isobutylchloroformate, and 0.760 g. of p-tritylphenol, there is obtained a crude residue. The residue is subjected to silica gel chromatography, eluting with ethyl acetate. The residue obtained by concentration of selected fractions is recrystallized from ethyl acetate-hexane as the title compound, white free-flowing crystals, 0.165 g.) m.p. 96.3°–97.8° C., having Rf 0.7 (TLC on silica gel in ethyl acetate).

EXAMPLE 7

N-Acetyl-L-tyrosinamide Ester of $PGE_2$ (Formula III-H)

Following the procedure of Example 1 but using 0.531 g. of $PGE_2$, 0.254 ml. of triethylamine, 0.238 ml. of isobutylchloroformate, and 0.480 g. of N-acetyl-L-tyrosinamide, there is obtained a crude residue. The residue is subjected to silica gel chromatography, eluting with methanol-ethyl acetate mixtures. The residue obtained by concentration of selected fractions is dissolved in 10 ml. of warm acetone and diluted with 5 ml. of hexane resulting in crystallization of the title compound, as white, free-flowing crystals, 0.205 g., m.p. 137.3°–140.8° C., having Rf 0.2 (TLC on silica gel in ethyl acetate containing 10% methanol).

EXAMPLE 8

N-Benzoyl-L-tyrosinamide Ester of $PGE_2$ (Formula III-I)

Following the procedure of Example 1 but using 0.531 g. of $PGE_2$, 0.254 ml. of triethylamine, 0.238 ml. of isobutylchloroformate, and 0.642 g. of N-benzoyl-L-tyrosinamide, there is obtained a crude residue. The residue is subjected to silica gel chromatography, eluting with ethyl acetate containing 10% methanol. The residue obtained by concentration of selected fractions is crystallized from acetone to yield the title compound, white free-flowing crystals, 0.240 g., m.p. 160.8°–164.8° C., having Rf 0.6 (TLC on silica gel in ethyl acetate containing 10% methanol).

EXAMPLE 9 p-Hydroxybenzaldehyde Semicarbazone Ester of $PGE_2$ (Formula III-J)

Following the procedure of Example 1 but using 0.516 g. of $PGE_2$, 0.264 ml. of triethylamine, 0.249 ml. of isobutylchloroformate, and 1.4 g. of p-hydroxybenzaldehyde semicarbazone, there is obtained a crude oily residue. This residue is dissolved in 25 ml. of acetonitrile and left at about 25° C. until the excess starting phenol crystallizes out and is then filtered off. The filtrate is concentrated and subjected to silica gel chromatography, eluting with acetonitrile followed by tetrahydrofuran-acetonitrile (3:2). The residue obtained by concentration of selected fractions, a white solid, 0.495 g., is recrystallized, first from ethyl acetate-hexane, then from hot acetonitrile, as the title compound, white free-flowing crystals, 0.328 g., m.p. 125.3°–126.5° C., having Rf 0.4 (TLC on silica gel in tetrahydrofuranethyl acetate 3:2).

EXAMPLE 10 p-Hydroxyacetophenone Ester of $PGE_2$ (Formula III-K)

Following the procedure of Example 1 but using 0.561 g. of $PGE_2$, 0.264 ml. of triethylamine, 0.249 ml. of isobutylchloroformate, and 0.312 g. of p-hydroxyacetophenone, there is obtained a crude oily residue. This residue is subjected to silica gel chromatography, eluting with water-ethyl acetate (1:99). The residue obtained by concentration of selected fractions, an oil, is triturated in hexane to yield a solid which is recrystallized from ethyl acetate-hexane to yield the title compound, white free-flowing crystals, 0.513 g., m.p. 76.8°–77.8° C., having Rf 0.5 (TLC on silica gel in ethyl acetate).

EXAMPLE 11 p-Hydroxybenzamide Ester of $PGE_2$ (Formula III-L)

Following the procedure of Example 1 but using 0.561 g. of $PGE_2$, 0.264 ml. of triethylamine, 0.243 ml. of isobutylchloroformate, and 0.5 g. of p-hydroxybenzamide, there is obtained a crude residue. This residue is subjected to silica gel chromatography, eluting with ethyl acetate-methanol (9:1). The residue obtained by concentration of selected fractions, an oil, 0.425 g., is crystallized from ethyl acetate-hexane to yield the title compound, white crystals, 0.294 g., m.p. 106.3°–108.3° C., having Rf 0.6 (TLC on silica gel in ethyl acetate-methanol (9:1)).

EXAMPLE 12

15-Methyl-$PGE_2$, p-Acetamidophenyl Ester (Formula III-A)

Following the procedure of Example 1 but using 0.163 g. of 15-methyl-$PGE_2$, 0.186 ml. of triethylamine, 0.174 ml. of isobutylchloroformate, and 0.538 g. of p-acetamidophenol, there is obtained a crude residue. This residue is dissolved in chloroform and left at about 25° C. until the excess starting phenol crystallizes out and is then filtered off. The filtrate is concentrated and subjected to silica gel chromatography, eluting with chloroform-acetonitrile (1:1) followed by acetonitrile. The residue obtained by concentration of selected fractions, an oil, 0.067 g., is crystallized from ethyl acetate on addition of hexane as the title compound, white free-flowing crystals, 0.042 g., m.p. 114.3°–116.0° C., having Rf 0.6 (TLC on silica gel in ethyl acetate).

EXAMPLE 13

15-Methyl-$PGE_2$, p-Benzamidopheny Ester (Formula III-B)

Following the procedure of Example 1 but using 0.176 g. of 15-methyl-$PGE_2$, 0.133 ml. of triethylamine, 0.126 ml. of isobutylchloroformate, and 0.900 g. of p-benzamidophenol, there is obtained a crude semi-solid residue. This residue is partitioned between 100 ml. of chloroform and 75 ml. of 0.1 N. aqueous monosodium dihydrogen orthophosphate. The organic phase is dried over sodium sulfate and concentrated to a white solid. The residue is subjected to silica gel chromatography, eluting with chloroform-ethylacetate (1:1) followed by acetone-ethyl acetate (1:4). The residue obtained by concentration of selected fractions, a colorless oil, 0.143 g., is crystallized from ethyl acetate on addition of hexane as the title compound, white free-flowing crystals, 0.126 g., m.p. 119.8°–121.8° C., having Rf 0.7 (TLC on silica gel in ethyl acetate).

EXAMPLE 14

15(R)-15-Methyl-PGE$_2$, p-Acetamidophenyl Ester (Formula III-A)

Following the procedure of Example 1 but using 0.200 g. of 15(R)-15-methyl-PGE$_2$, 0.153 ml. of triethylamine, 0.142 ml. of isobutylchloroformate, and 0.453 g. of p-acetamidophenol, there is obtained a crude oily residue. This residue is dissolved in chloroform and left at about 25° C. until the excess starting phenol crystallizes out and is then filtered off. The filtrate is concentrated and subjected to silica gel chromatography, eluting with chloroformacetonitrile (3:2). The residue obtained by concentration of selected fractions, an oil, 0.25 g., having Rf 0.3 (TLC on silica gel in chloroform-acetonitrile 3:2).

EXAMPLE 15

15(R)-15-Methyl-PGE$_2$, p-Benzamidophenyl Ester (Formula III-B)

Following the procedure of Example 1 but using 0.175 g. of 15(R)-15-Methyl-PGE$_2$, 0.100 ml. of triethylamine, 0.093 ml. of isobutylchloroformate, and 0.6 g. of p-benzamidophenol, there is obtained a crude solid residue. This residue is subjected to silica gel chromatography, eluting with chloroform, chloroform-acetonitrile (9:1), chloroform-acetonitrile (2:1), and chloroform-acetonitrile (1:3). The residue obtained by concentration of selected fractions is rechromatographed to remove traces of the starting phenol, thereby yielding a colorless oil, 0.173 g. This oil is crystallized from ethyl acetate on addition of hexane as the title compound, white free-flowing crystals, 0.153 g., m.p. 88.3°–90.3° C., having Rf 0.5 (TLC on silica gel in acetonitrile-chloroform 1:1).

EXAMPLE 16 p-Hydroxybenzaldehyde Semicarbazone Ester of 15(R)-15-Methyl-PGE$_2$ (Formula III-J)

Following the procedure of Example 1 but using 0.200 g. of 15(R)-15-methyl-PGE$_2$, 0.153 ml. of triethylamine, 0.142 ml. of isobutylchloroformate, and 0.546 g. of p-hydroxybenzaldehyde semicarbazone, there is obtained a crude oily residue. This residue is dissolved in ethyl acetate and washed with aqueous 0.1 N. sodium phosphate buffer at pH 6.0. The organic phase is dried over sodium sulfate and concentrated to a white solid. The residue is subjected to preparative thin-layer chromatography using ethyl acetate-methanol (9:1) and eluting with acetone-methanol (3:1) to yield a colorless oil. This oil is chromatographed on silica gel, eluting with acetonitrile. The residue obtained by concentration of selected fractions, a white solid, 0.160 g., is recrystallized from acetone on addition of water to give the title compound, white free-flowing crystals, 0.085 g., m.p. 92.3°–93.3° C., having Rf 0.5 (TLC in acetonitrile-methanol 9:1).

Following the procedures of Examples 1–16 but employing the racemic forms of the PG compounds, there are obtained the corresponding esters of racemic PG compounds.

EXAMPLES 17–59

The substituted phenyl and naphthyl esters of PGE$_2$, 15-methyl-PGE$_2$, and 15(R)-15-methyl-PGE$_2$ of Tables I–III below are obtained following the procedures of Example 1, wherein the prostaglandin compound is reacted in the presence of triethylamine and isobutyl-chloroformate with the appropriate hydroxy phenyl or naphthyl compound, listed in the Table. These phenols or naphthols are readily available or prepared by methods described herein or known in the art. The crude products, obtained by concentration under reduced pressure, are purified by means described herein or known in the art, including partitioning, solvent extraction, washing, silica gel chromatography, trituration, or crystallization.

Following the procedures of Examples 17–59 but employing the racemic forms of the PG compounds, there are obtained the corresponding esters of the racemic PG compounds.

TABLE I

Esters of PGE$_2$

| Ex. | Hydroxy Phenyl or Naphthyl Compound | Product PGE$_2$ ester of formula: |
|---|---|---|
| 17 | p-(p-benzamidobenzamido)-phenol | III-D |
| 18 | N-(p-tritylphenyl)-p-hydroxybenzamide | III-M |
| 19 | p-hydroxybenzoic acid, methyl ester | III-N |
| 20 | hydroquinone benzoate | III-O |
| 21 | hydroquinone, p-acetamidobenzoic acid ester | III-P |
| 22 | 2,4-diacetamidophenol | III-Q |
| 23 | 1-acetamido-4-hydroxy-naphthalene | III-R |
| 24 | 1-benzamido-4-hydroxy-naphthalene | III-S |
| 25 | 1-hydroxy-4-ureido-naphthalene | III-T |

TABLE II

Esters of 15-Methyl-PGE$_2$

| Ex. | Hydroxy Phenyl or Naphthyl Compound | Product 15-Methyl-PGE$_2$ ester of formula: |
|---|---|---|
| 26 | p-(p-acetamidobenzamido)-phenol | III-C |
| 27 | p-(p-benzamidobenzamido)-phenol | III-D |
| 28 | p-hydroxyphenylurea | III-E |
| 29 | p-phenylphenol | III-F |
| 30 | p-tritylphenol | III-G |
| 31 | N-acetyltyrosinamide | III-H |
| 32 | N-benzoyltyrosinamide | III-I |
| 33 | p-hydroxyacetophenone | III-K |
| 34 | p-hydroxybenzamide | III-L |
| 35 | N-(p-tritylphenyl)-p-hydroxybenzamide | III-M |
| 36 | p-hydroxybenzoic acid, methyl ester | III-N |
| 37 | hydroquinone benzoate | III-O |
| 38 | hydroquinone, p-acetamidobenzoic acid ester | III-P |
| 39 | 2,4-diacetamidophenol | III-Q |
| 40 | 1-acetamido-4-hydroxy-naphthalene | III-R |
| 41 | 1-benzamido-4-hydroxy-naphthalene | III-S |
| 42 | 1-hydroxy-4-ureido-naphthalene | III-T |

TABLE III

Esters of 15(R)-15-Methyl-PGE$_2$

| Ex. | Hydroxy Phenyl or Naphthyl Compound | Product 15(R)-15-Methyl-PGE$_2$ ester of formula: |
|---|---|---|
| 43 | p-(p-acetamidobenzamido)phenol | III-C |
| 44 | p-(p-benzamidobenzamido)phenol | III-D |
| 45 | p-hydroxyphenylurea | III-E |
| 46 | p-phenylphenol | III-F |
| 47 | p-tritylphenol | III-G |
| 48 | N-acetyltyrosinamide | III-H |
| 49 | N-benzoyltyrosinamide | III-I |
| 50 | p-hydroxyacetophenone | III-K |
| 51 | p-hydroxybenzamide | III-L |
| 52 | N-(p-tritylphenyl)-p-hydroxybenzamide | III-M |
| 53 | p-hydroxybenzoic acid, methyl ester | III-N |
| 54 | hydroquinone benzoate | III-O |
| 55 | hydroquinone, p-acetamidobenzoic acid ester | III-P |
| 56 | 2,4-diacetamidophenol | III-Q |
| 57 | 1-acetamido-4-hydroxynaphthalene | III-R |
| 58 | 1-benzamido-4-hydroxynaphthalene | III-S |
| 59 | 1-hydroxy-4-ureidonaphthalene | III-T |

I claim:
1. An optically active compound of the formula:

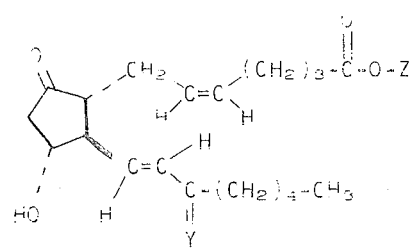

or a racemic compound of that formula and the mirror image thereof, wherein Z is

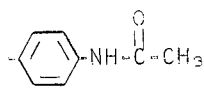

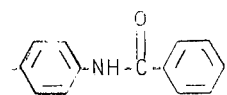

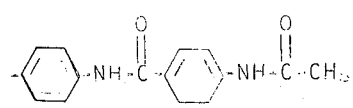

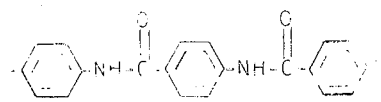

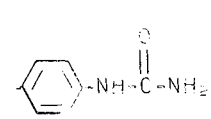

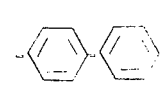

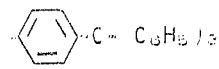

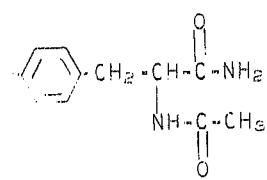

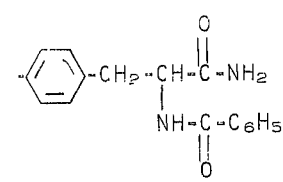

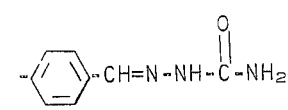

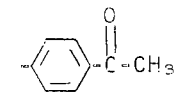

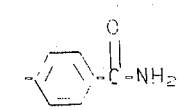

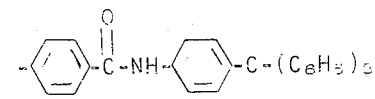

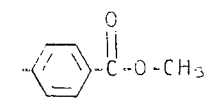

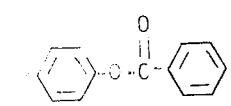

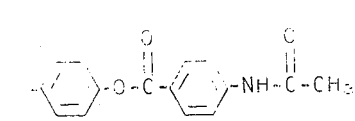

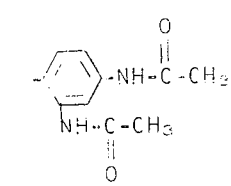

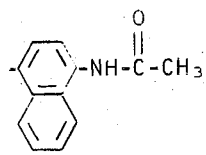
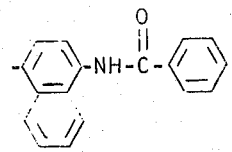 or
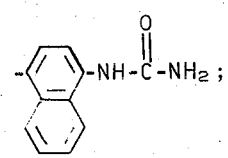
and wherein Y is $\overset{H}{\diagup}\overset{OH}{\diagdown}$, $\overset{CH_3}{\diagup}\overset{OH}{\diagdown}$, $\overset{C_2H_5}{\diagup}\overset{OH}{\diagdown}$, $\overset{CH_3}{\diagdown}\overset{OH}{\diagup}$, or $\overset{C_2H_5}{\diagdown}$
2. An optically active compound of the formula:
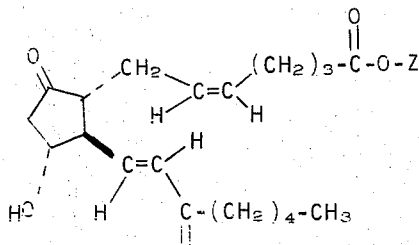
or a racemic compound of that formula and the mirror image thereof, wherein Z is
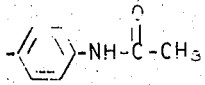
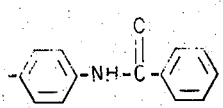
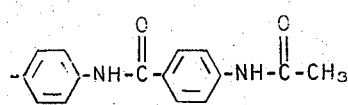
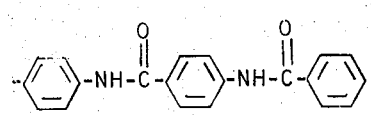
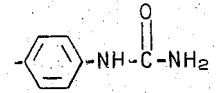
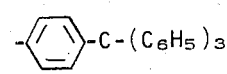
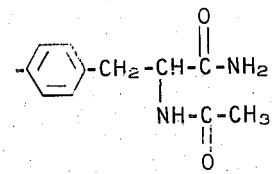
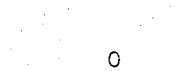
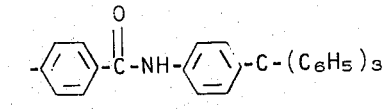

[Column 1 structures, Z group options continued:]

- -C₆H₄-C(=O)-O-CH₃
- -C₆H₄-O-C(=O)-C₆H₅
- -C₆H₄-O-C(=O)-C₆H₄-NH-C(=O)-CH₃
- -C₆H₄(-NH-C(=O)-CH₃)(-NH-C(=O)-CH₃)
- -naphthyl-NH-C(=O)-CH₃
- -naphthyl-NH-C(=O)-C₆H₅
- -naphthyl-NH-C(=O)-NH₂ ;

and wherein Y is $H\diagup OH$, $CH_3\diagup OH$, $C_2H_5\diagup OH$, $CH_3\diagdown OH$, or $C_2H_5\diagdown OH$.

3. An optically active compound of the formula:

[Structure: cyclopentanone with CH₂-CH=CH-(CH₂)₃-C(=O)-O-Z substituent and CH=C-(CH₂)₄-CH₃ substituent with Y, HO group]

or a racemic compound of that formula and the mirror image thereof, wherein Z is (1) 
$$-C_6H_4-NH-\overset{O}{\underset{\|}{C}}-R_1$$

wherein $R_1$ is -CH₃

-C₆H₅

-C₆H₄-NH-C(=O)-CH₃

-C₆H₄-NH-C(=O)-C₆H₅  or

-NH₂ ;

(2) -C₆H₃(-NH-C(=O)-CH₃)(-NH-C(=O)-CH₃) ;  or (3) -naphthyl-NH-C(=O)-R₂ wherein $R_2$ is -CH₃

-C₆H₅  or

-NH₂ ;

and wherein Y is $H\diagup OH$, $CH_3\diagup OH$, $C_2H_5\diagup OH$, $CH_3\diagdown OH$, or $C_2H_5\diagdown OH$.

4. An optically active compound of the formula:

[Structure: similar cyclopentanone structure with CH₂-CH=CH-(CH₂)₃-C(=O)-O-Z and =C-(CH₂)₄-CH₃ with Y, HO group]

or a racemic compound of that formula and the mirror image thereof, wherein Z is

 or

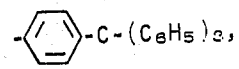

and wherein Y is H OH, CH₃ OH,

5. An optically active compound of the formula:

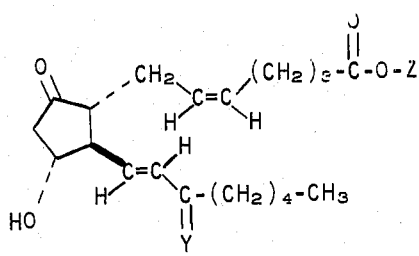

or a racemic compound of that formula and the mirror image thereof, wherein Z is

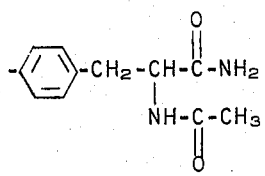

or

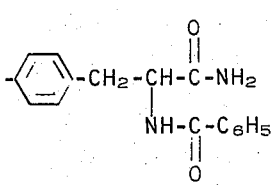

or

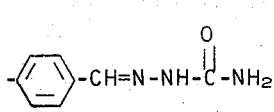

and wherein Y is H OH, CH₃ OH, C₂H₅ OH, CH₃ OH, or C₂H₅ OH

6. An optically active compound of the formula:

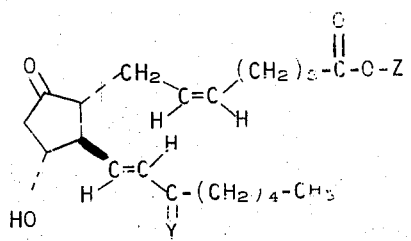

or a racemic compound of that formula and the mirror image thereof, wherein Z is (1) 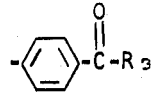

wherein R₃ is

-CH₃

-NH₂

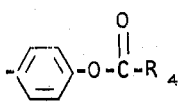 or

-O-CH₃;

or (2) 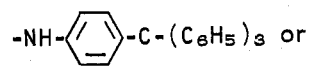

wherein R₄ is  or

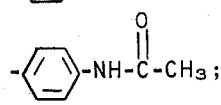

7. The p-acetamidophenyl ester of PGE₂, a compound according to claim 1.

8. The p-benzamidophenyl ester of PGE₂, a compound according to claim 1.

9. The p-(p-acetamidobenzamido)phenyl ester of PGE₂, a compound according to claim 1.

10. The ester of p-hydroxyphenylurea and PGE₂, a compound according to claim 1.

11. The p-biphenyl ester of PGE₂, a compound according to claim 1.

12. The p-tritylphenyl ester of PGE₂, a compound according to claim 1.

13. The ester of N-acetyltyrosinamide and PGE₂, a compound according to claim 1.

14. The ester of N-benzoyltyrosinamide and PGE₂, a compound according to claim 1.

15. The ester of p-hydroxybenzaldehyde semicarbazone and PGE₂, a compound according to claim 1.

16. The ester of p-hydroxyacetophenone and PGE₂, a compound according to claim 1.

17. The ester of p-hydroxybenzamide and PGE₂, a compound according to claim 1.

18. The p-acetamidophenyl ester of 15-methyl-PGE₂, a compound according to claim 1.

19. The p-benzamidophenyl ester of 15-methyl-PGE₂, a compound according to claim 1.

20. The p-acetamidophenyl ester of 15(R)-15-methyl-PGE₂, a compound according to claim 1.

21. The p-benzamidophenyl ester of 15(R)-15-methyl-PGE₂, a compound according to claim 1.

22. The ester of p-hydroxybenzaldehyde semicarbazone and 15(R)-15-methyl-PGE₂, a compound according to claim 1.

23. Free-flowing crystals of a compound of the formula:

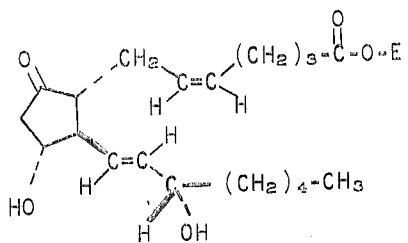

wherein E is

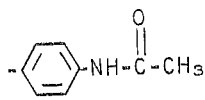

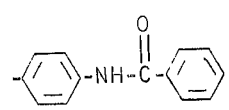

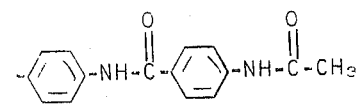

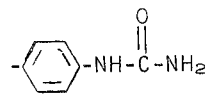

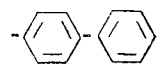

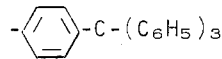

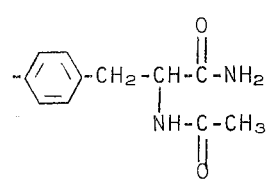

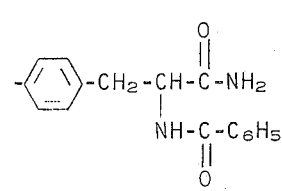

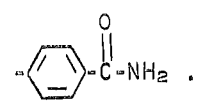

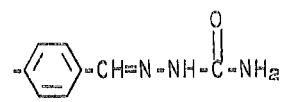

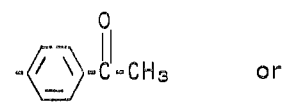

24. Free-flowing crystals of a compound of the formula:

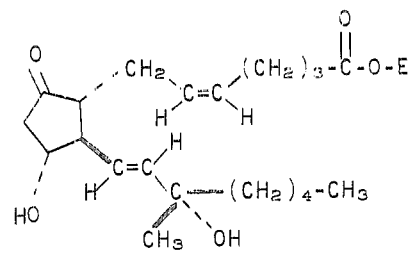

wherein E is

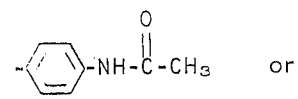   or

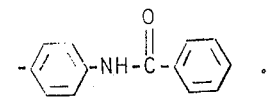

25. Free-flowing crystals of a compound of the formula:

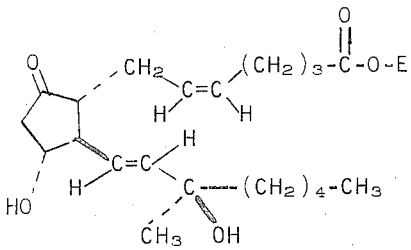

wherein E is

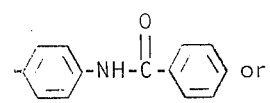   or

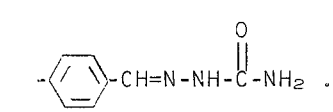

* * * * *